(No Model.)

H. W. R. STRONG.
HOOK AND EYE.

No. 307,687. Patented Nov. 4, 1884.

Witnesses,
Geo. H. Strong
J. S. Rourke

Inventor,
Harriet W. R. Strong
By
Dewey & Co.
Attorneys

** # UNITED STATES PATENT OFFICE.

HARRIET W. R. STRONG, OF OAKLAND, CALIFORNIA.

HOOK AND EYE.

SPECIFICATION forming part of Letters Patent No. 307,687, dated November 4, 1884.

Application filed August 19, 1884. (No model.)

*To all whom it may concern:*

Be it known that I, HARRIET W. R. STRONG, of the city of Oakland, county of Alameda, and State of California, have invented an Improvement in Hooks and Eyes; and I hereby declare the following to be a full, clear, and exact description thereof.

My invention relates to a new and useful hook and eye for fastening clothing, garments, &c; and my invention consists in a double hook the parts of which are bent in opposite directions and lie in the same continuous or flat plane, said hook having a stem and double fastening-loops also lying approximately in the same continuous or flat plane with the hooks, and a double eye for engaging the hooks and forming between its parts a spring-socket for the reception of the stem of the hook, said eye having a stem and double securing-loops, all of which I shall hereinafter fully explain.

The object of my invention is to provide a strong hook and eye adapted by its construction to form a complete and secure engagement, and to lie to a good advantage, being readily concealed.

Figure 2:
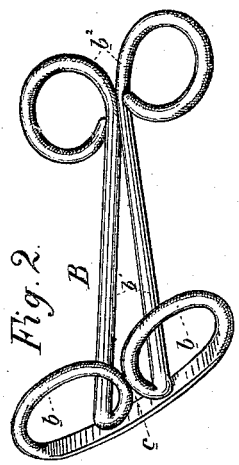
Figure 3:
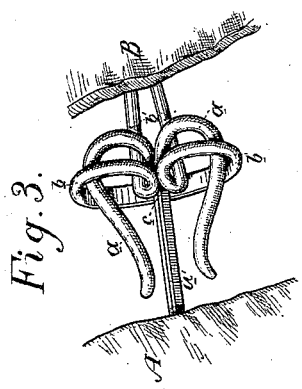
Figure 1:
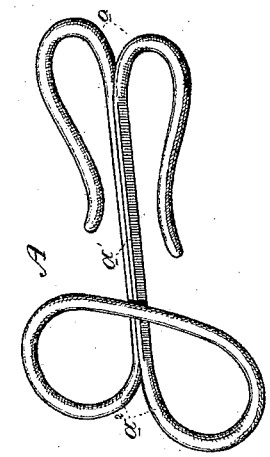

Referring to the accompanying drawings, Figure 1 is a view of the hook with its stem and loops. Fig. 2 is a view of the eye with its stem and loops. Fig. 3 is a view showing their engagement.

A piece of wire, A, is bent to form the double hook $a$ at its front, the rearwardly-extending shank or stem $a'$, and the double loop $a^2$ at its back. These are preferably made of a single wire; and it will be observed that the loops $a^2$, the two parts of the stem $a'$, and the parts of the hook $a$ lie approximately in a continuous flat plane. The parts or branches of the stem $a'$ lie very close together, and are flattened sidewise for a purpose I shall presently explain. Another piece of wire, B, is bent to form the double eye $b$ at its front, the rearwardly-extending shank or stem $b'$, and the double loop $b^2$ at its back. The loop and stem lie in a flat plane; but the parts of the double eye $b$ are bent in a plane at right angles to the stem, and are so curved at their upper portions as to cause their tops to just meet, from which point of contact they diverge to the points at which they blend into the branches of the stem, thus forming a socket, $c$, between them. The character of the wire renders the entrance to this socket a springy one, which opens to pressure to allow the passage of the stem $a'$ of the hook, and then closes again.

In Fig. 3 I show the engagement of the hook and eye. The stem $a'$ of the hook is brought against the point of contact of the parts of the eye $b$ and is forced down between them into the socket $c$. The parts of the double hook $a$ are then drawn back, whereby they enter the parts of the double eye $b$, whereupon the engagement is complete. The loops $a^2$ and $b^2$ are for attaching the hook and eye to the material in the usual manner, though the attachment may be made by eyelets, if preferred. It will be seen that both hook and eye are doubled, whereby the required strength is obtained. By making them as flat as possible they lie to better advantage and may be more easily concealed, and by providing for the engagement of the stem of the hook between the double eye $b$ the parts are held straight and have no tendency to disengage.

Having thus described my invention, what I claim as new, and desire to secure by Letters Patent, is—

1. A hook and eye consisting of the double hook $a$ the parts of which are bent oppositely and lie in the same continuous or flat plane, and a double eye, $b$, adapted to receive the double hook, substantially as herein described.

2. A hook and eye consisting of the double hook $a$ the parts of which are bent oppositely in the same flat plane, said hook having a stem, $a'$, and double fastening-loop $a^2$, lying in the same flat plane with the hook, and a double eye, $b$, adapted to receive the hook $a$, substantially as herein described.

3. A hook and eye consisting of the double flat hook $a$, having stem $a'$ and double fastening-loop $a^2$, and the double eye $b$, having stem $b'$ and double fastening-loop $b^2$, substantially as herein described.

4. A hook and eye consisting of a wire, A, bent to form the loops $a^2$, the stem $a'$, and oppositely-bent hooks $a$, all lying in the same continuous or flat plane, and a wire, B, bent to form the loops $b^2$, the stem $b'$, and the eyes $b$, for engaging the hooks $a$ and forming between them a spring-socket, $c$, for the reception of the stem $a'$ of the hook-wire, substantially as herein described.

In witness whereof I have hereunto set my hand.

HARRIET W. R. STRONG.

Witnesses:
WILL H. BURRALL,
ROBERT A. JACKSON.